J. D. BEARD.
EDUCATIONAL APPLIANCE.
APPLICATION FILED JUNE 18, 1915.

1,158,774.

Patented Nov. 2, 1915.
2 SHEETS—SHEET 1.

Witnesses

Inventor
J. D. Beard
By Victor J. Evans
Attorney

J. D. BEARD.
EDUCATIONAL APPLIANCE.
APPLICATION FILED JUNE 18, 1915.

1,158,774.

Patented Nov. 2, 1915.
2 SHEETS—SHEET 2.

Witnesses
M. H. Slifer
D. W. Gould

Inventor
J. D. Beard
By Victor J. Evans
Attorney

UNITED STATES PATENT OFFICE.

JOHNSON D. BEARD, OF TAYLORSVILLE, KENTUCKY.

EDUCATIONAL APPLIANCE.

1,158,774. Specification of Letters Patent. Patented Nov. 2, 1915.

Application field June 18, 1915. Serial No. 34,955.

*To all whom it may concern:*

Be it known that I, JOHNSON D. BEARD, a citizen of the United States, residing at Taylorsville, in the county of Spencer, and State of Kentucky, have invented new and useful Improvements in Educational Appliances, of which the following is a specification.

The invention relates to an educational appliance adapted more particularly wherein multiplication of any numbers within the range of the apparatus may be automatically protected by a proper disposition of the parts to disclose the products.

The main object of the present invention is the provision of an apparatus of this type embodying certain movable parts adapted to be adjusted by the operator having in mind a certain multiplicand and a certain multiplier, the arrangement of the device under these circumstances automatically disclosing the product of such multiplication.

The invention in its preferred form of details will be described in the following specification, reference being particularly had to the accompanying drawings, in which:—

Figure 1:
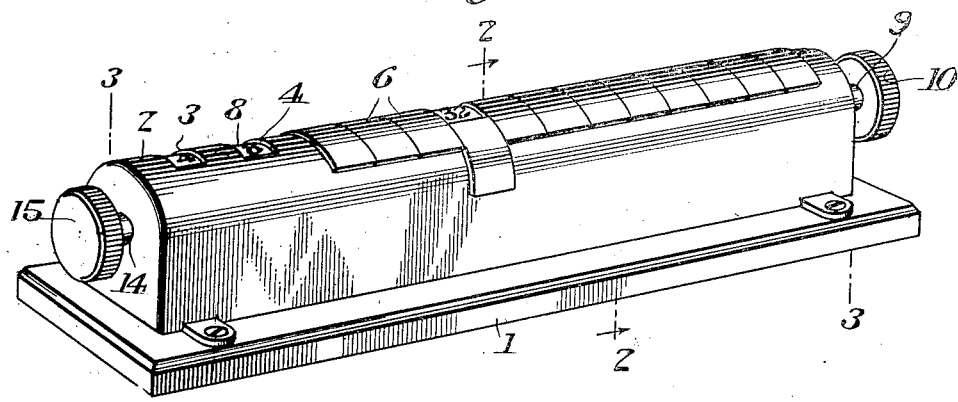
Figure 2:
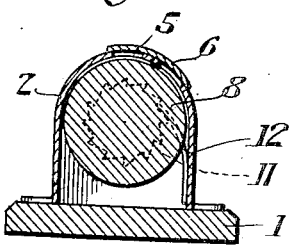
Figure 3:
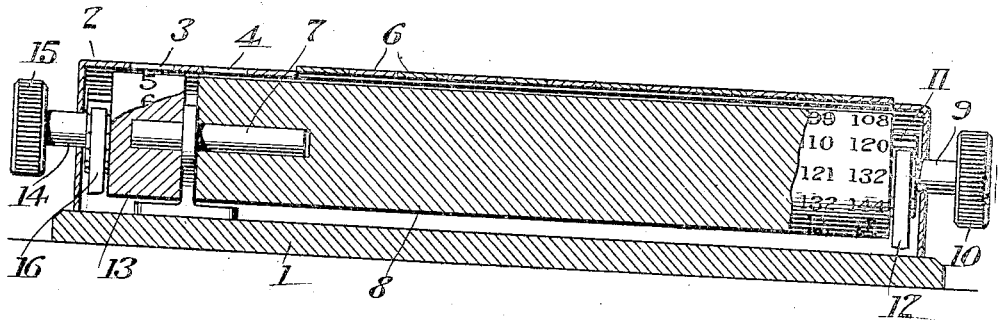
Figure 4:
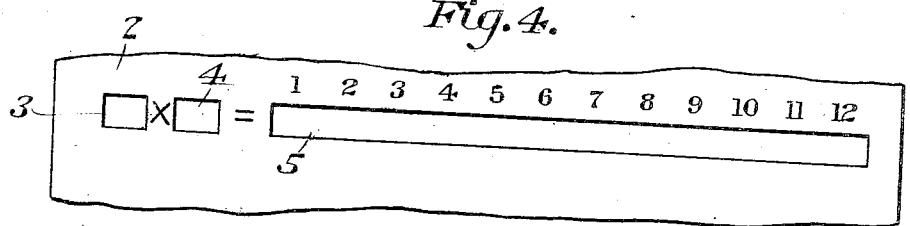

Figure 1 is a perspective view of the apparatus. Fig. 2 is a transverse section on the line 2—2 of Fig. 1. Fig. 3 is a longitudinal section on the line 3—3 of Fig. 1. Fig. 4 is a development of the various number-bearing parts.

In the accompanying drawings, the improved apparatus is shown to comprise a base 1 on which is fixedly arranged a casing 2, which for the greater portion of its surface is of cylindrical shape. The upper portion of the casing is formed near one end with a sight opening 3 and adjacent said opening and in the line thereof longitudinally of the casing is a second sight opening 4 and with a slot or extended opening 5. The sight openings 3 and 4 remain permanently open while the slot is adapted to be closed throughout its length by a series of transversely operating slides 6, any one of which may be opened to expose a portion of the slot. As will later appear the slides equal in number the number of columns on the product indicating surface of the interior cylinder, there being one slide for each column so that upon manipulation of the slide to expose the corresponding portion of the slot, the particular column underlying that slide, or any number therein may be exposed through the opening thus provided.

A shaft 7 is fixed within the casing and mounted upon this shaft is a cylinder 8 formed at one end with a reduced offset 9 projecting through an opening in the end wall of the casing and provided with a manipulating knob or handle 10. The offset 9 within the casing immediately adjacent the end wall is preferably provided with a series of notches 11 corresponding in number to the number of figures in each column of the product-bearing face of the cylinder, a leaf spring 12 coöperating with these notches so that upon turning the cylinder, by means of the knob, to expose any particular figure or row of figures, the spring will act to hold the cylinder in said position against accidental displacement.

The cylinder is of a length to extend from one end of the casing to a position slightly beyond the sight opening 4, but not extending, however, so as to underlie the sight opening 3. Mounted upon the shaft 7 is a disk 13 arranged so that it underlies the sight opening 3. The disk is arranged for movement independent of the cylinder being similarly provided with an offset 14, manipulating knob 15 and not engaging spring 16 for the purpose previously noted in connection with the cylinder. By this arrangement, the cylinder is operated from one end of the casing and the disk from the opposite end.

To illustrate simply the use of the device, I have confined numerical illustration to simple multiplication of the numbers of 1 to 12, inclusive. For this purpose the peripheral face of the disk will have thereon, either by means of a printed slip or any other matter, a series of numerals from 1 to 12, these numerals being visible through the sight opening 3 in accordance with the position of the disk. The cylinder 8 will have on its face a row of numerals from 1 to 12, corresponding to the numerals on the disk, these numerals on the cylinder being visible through the sight opening 4, as the cylinder is rotated.

In addition to the numerals just described, the cylinder bears a product series of numerals arranged in twelve columns and twelve rows longitudinally of the cylinder. The first row longitudinally of the cylinder embodies the numerals from 1 to 12, the second row longitudinally of the cylinder being the product of the first row multiplied by two, the numerals of the third row being the product of the numerals of the first row multiplied by three.

The numerals of the disk indicate the multiplier while the first row of numerals on the cylinder indicate the multiplicand, while the remaining numerals indicate the product. The numerals on the disk also have an additional significance in indicating the particular slide 6 to be operated. For example, assuming it to be desired to multiply twelve by eleven the disk will be turned to expose numeral 12 through the sight opening 3. The numeral indicated, that is 12, will also designate the bottom slide to be moved so that the twelfth or last slide will be operated to expose the corresponding portion of the slot 5. 11 being the other numeral of the multiplication, the cylinder will be turned until 11 appears through the sight opening 4, whereupon the product 132 would appear through the exposed portion of the slot 5.

It is thus apparent that any multiplication within the numeral range of the structure may be readily accomplished in a simple, expeditious manner, and while I have shown the use of numerals from 1 to 12, only, as multiplier and multiplicand, it will be understood that I contemplate arranging the device for any numerals, and particularly for fractions, as in this use it will prove of great assistance to many whose duties involve the multiplication of fractions and in which multiplication error is easy.

The mechanical parts of the structure are simple, easily and quickly assembled and but little liable to become disarranged in use. The material is not important so long as it serves the purpose and I contemplate the use of any material and in applying the numerals to the structure in any desired manner.

I claim:—

1. An educational device involving a casing formed with adjacent sight openings and with a slot, a cylinder rotatably mounted in the casing and having a series of numerals adapted for exposure through one of the sight openings and a series of columns of numerals adapted for exposure through the slot, a disk mounted for movement independent of the casing and having a series of numerals arranged for exposure through one of the sight openings, and means for exposing a particular column only through the slot opening.

2. An educational device involving a casing formed with adjacent sight openings and with a slot, a cylinder rotatably mounted in the casing and having a series of numerals adapted for exposure through one of the sight openings and a series of columns of numerals adapted for exposure through the slot, a disk mounted for movement independent of the casing and having a series of numerals arranged for exposure through one of the sight openings, a series of slides for closing the slot and corresponding in number to the number of columns on the cylinder.

3. An educational device involving a casing formed with adjacent sight openings and with a slot, a cylinder rotatably mounted in the casing and having a series of numerals adapted for exposure through one of the sight openings, and a series of columns of numerals adapted for exposure through the slot, a disk mounted for movement independent of the casing and having a series of numerals arranged for exposure through one of the sight openings, a series of slides for closing the slot and corresponding in number to the number of columns on the cylinder, each of the slides independently operable at will, and means for diametrically locking the cylinder to expose any particular opening or series of openings through the casing.

In testimony whereof I affix my signature in presence of two witnesses.

JOHNSON D. BEARD.

Witnesses:
ROBERT E. HOLLOWAY,
ALONZO T. BEARD.